United States Patent Office.

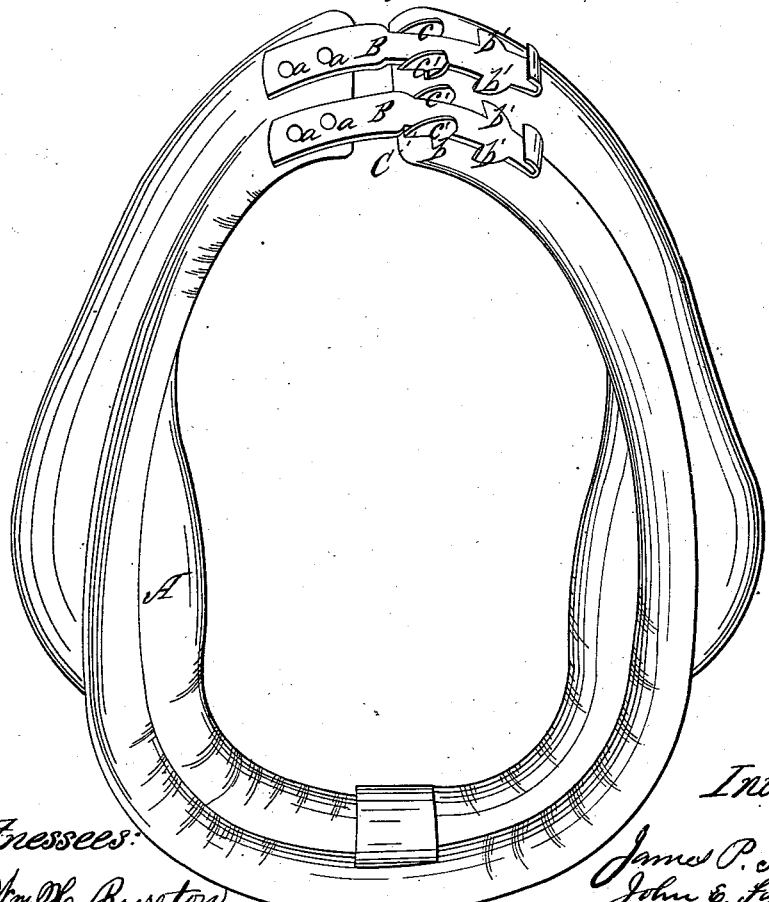

JAMES P. FORCE AND JOHN E. FORCE, OF CONSTANTINE, MICHIGAN.

Letters Patent No. 84,687, dated December 8, 1868; antedated November 21, 1868.

IMPROVED FASTENING FOR HORSE-COLLARS.

*To all whom it may concern:*

Be it known that we, JAMES P. FORCE and JOHN E. FORCE, both of Constantine, in the county of St. Joseph, Michigan, have invented a new and improved Fastening for Horse-Collars; and we do hereby declare the following to be a full, clear, and exact description thereof, reference being had to the accompanying drawing, which is made a part of this specification.

Our invention relates to a fastening for adjustably securing the open end of the collar, left open to facilitate its placement on the animal's neck.

It consists of two members, a flexible metallic strap or latch, and a catch, both of simple construction, which may be cut and stamped in any suitable manner from sheet-metal, and attached to the respective ends of the collar by rivets, or other suitable means, a sufficient number of them being employed to render the fastening secure.

In the drawings—

Figure 1 is a perspective view of a horse-collar having our improved fastening, the fastening being represented in its closed or coupled position.

Figure 2 is a similar view of the fastening, detached, showing the members separated.

A represents a collar, of ordinary construction, whose upper end is left open in manufacture, for the purpose before explained.

B B are flexible metallic straps or latches, attached to the end, A', of the collar by rivets, a; and C C, catches, similarly attached to the end, A".

The latches B are each formed with two or more pairs of laterally-projecting hooks or shoulders, $b\ b'$, to adapt them to hold the ends at greater or less distance apart; holes, $b''$, for the passage of rivets, to attach them to the collar; and a handle, $b'''$, by which to manipulate them. They are stamped complete from sheets of any suitable metal.

The catches C are formed with rearwardly-projecting lugs, $c$, the distance between which corresponds with the width of that part of the latches B from which the hooks or shoulders $b\ b'$ project, under which the shoulders $b\ b'$ engage, as represented in fig. 1, to fasten the collar. They have also holes, $c'$, for the passage of rivets, to fasten them to the collar.

They are of the same material, and produced in the same manner as the latches B, and the two may readily be made at one and the same operation.

The shoulders $b\ b'$, by being made of the form represented at $b'$, fig. 1, will tend to draw the sides of the catch C together, and thus increase the surety of the fastening.

Having thus described our invention,

The following is what we claim as new, and desire to secure by Letters Patent:

We claim the combination, with the collar A A' A", of the flexible straps or latches B and catches C, constructed and employed as and for the purpose described.

To the above specification of our improved fastening for horse-collars, we have signed our hands, this 26th day of February, A. D. 1868.

JAMES P. FORCE.
JOHN E. FORCE.

Witnesses:
CHARLES M. HASLET,
P. HASLET.